US011470110B2

(12) United States Patent
Margel et al.

(10) Patent No.: US 11,470,110 B2
(45) Date of Patent: Oct. 11, 2022

(54) IDENTIFYING AND CLASSIFYING COMMUNITY ATTACKS

(71) Applicant: Imperva, Inc., Redwood City, CA (US)

(72) Inventors: Shiri Margel, Petak Tikva (IL); Amit Leibovitz, Givat Shmuel (IL)

(73) Assignee: Imperva, Inc., San Mateo, CA (US)

( * ) Notice: Subject to any disclaimer, the term of this patent is extended or adjusted under 35 U.S.C. 154(b) by 162 days.

(21) Appl. No.: 16/730,926

(22) Filed: Dec. 30, 2019

(65) Prior Publication Data

US 2020/0259861 A1 Aug. 13, 2020

Related U.S. Application Data

(60) Provisional application No. 62/803,362, filed on Feb. 8, 2019.

(51) Int. Cl.
*H04L 9/00* (2022.01)
*H04L 9/40* (2022.01)
*H04L 41/22* (2022.01)

(52) U.S. Cl.
CPC .......... *H04L 63/1458* (2013.01); *H04L 41/22* (2013.01); *H04L 63/1416* (2013.01); *H04L 63/1425* (2013.01); *H04L 63/1433* (2013.01); *H04L 63/20* (2013.01)

(58) Field of Classification Search
USPC .......................................................... 726/22
See application file for complete search history.

(56) References Cited

U.S. PATENT DOCUMENTS 10,121,000 B1 * 11/2018 Rivlin ................... G06F 21/552
10,958,667 B1 * 3/2021 Maida ................. H04L 63/1441

OTHER PUBLICATIONS

"CVE-2018-7600," National Vulnerability Database, Mar. 1, 2018, downloaded from https://cve.mitre.org/cgi-bin/cvename.cgi?name=CVE-2018-7600 on Jan. 21, 2022, 2 pages.
Avital, et al., "Drupalgeddon 2.0: Are Hackers Slacking Off?," Imperva Blog, Apr. 13, 2018, downloaded from https://www.imperva.com/blog/drupalgeddon-2-0-are-hackers-slacking-off/ on Jan. 21, 2022, pp. 1-6.

(Continued)

*Primary Examiner* — Christopher J Brown
(74) *Attorney, Agent, or Firm* — Nicholson, De Vos, Webster & Elliott, LLP

(57) ABSTRACT

A method by one or more electronic devices for identifying and classifying community attacks. The method includes determining, for each of a plurality of enterprise networks, one or more incidents occurring in that enterprise network based on analyzing security alerts generated by a web application layer attack detector used to protect a web application hosted in that enterprise network, where each incident represents a group of security alerts that have been determined as being associated with the same security event, grouping incidents occurring across the plurality of enterprise networks into groups of incidents, where incidents that are determined as having similar features are grouped into the same group of incidents, and classifying each of one or more of the groups of incidents as being an industry-based attack or a spray-and-pray attack based on industry classifications of incidents within that group of incidents.

20 Claims, 10 Drawing Sheets

(56) References Cited

OTHER PUBLICATIONS

Bhuyan, A., "Over 750,000 debit and credit cards for sale found on the deep web," Feb. 23, 2018, downloaded from https://medium.com/beyond-the-perimeter/over-750-000-debit-and-credit-cards-for-sale-found-on-the-deep-web-434e050ac59f on Jan. 21, 2022, pp. 1-7.

Chandel, R., "Web Application Penetration Testing with curl," Raj Chandel's Blog, Hacking Articles, Aug. 10, 2017, downloaded from web.archive.org/web/20170928072358/https://www.hackingarticles.in/web-application-penetration-testing-curl/ on Jan. 21, 2022, pp. 1-9.

GitHub—dreadlocked/Drupalgeddon2, "Exploit for Drupal v7.x + v8.x (Drupalgeddon 2 / CVE-2018-7600 / SA-CORE-2018-002)," Internet Archive capture from Aug. 27, 2018, downloaded from web.archive.org/web/20180827114339/https://github.com/dreadlocked/Drupalgeddon2 on Jan. 21, 2022, pp. 1-5.

Gilad Yehudai, "Clustering App Attacks with Machine Learning Part 1: A Walk Outside the Lab," Jun. 5, 2018, 5 pages, Imperva, downloaded from https://www.imperva.com/blog/clustering-app-attacks-with-machine-learning-part-1-a-walk-outside-the-lab/ on Jan. 31, 2019.

Gilad Yehudai, "Clustering App Attacks with Machine Learning Part 2: Calculating Distance," Jun. 12, 2018, 4 pages, Imperva, downloaded from https://www.imperva.com/blog/clustering-app-attacks-with-machine-learning-part-2-calculating-distance/ on Jan. 31, 2019.

Gilad Yehudai, "Clustering App Attacks with Machine Learning Part 3: Algorithm Results," Jun. 19, 2018, 4 pages, Imperva, downloaded from https://www.imperva.com/blog/clustering-app-attacks-with-machine-learning-part-3-algorithm-results/ on Jan. 31, 2019.

"Imperva Attack Analytics—Datasheet—Uncover Attacks Hiding in an Avalanche of Security Events," 2018, 3 pages, Imperva, Inc.

\* cited by examiner

IDENTIFYING AND CLASSIFYING COMMUNITY ATTACKS

CROSS-REFERENCE TO RELATED APPLICATIONS

This application claims the benefit of U.S. Provisional Application No. 62/803,362, filed Feb. 8, 2019, which is hereby incorporated by reference.

TECHNICAL FIELD

Embodiments of the invention relate to the field of computer network security, and more specifically, to identifying and classifying community attacks.

BACKGROUND ART

A web application layer attack detector (e.g., a web application firewall) typically sits in front of a web application server to protect the web application server from attacks by web application clients. The web application layer attack detector can see the traffic being sent between the web application clients and the web application server, including web application layer requests (e.g., HTTP request messages) sent by the web application clients to the web application server, and can scan these requests for potential attacks.

A web application layer attack detector may generate a security alert whenever it suspects an attack or otherwise detects suspicious/anomalous behavior. The security alert may describe various features pertaining to the suspected attack. A web application layer attack detector for an enterprise (e.g., protecting a web application server hosted by the enterprise) may generate a large volume of security alerts, sometimes on the magnitude of thousands to millions per day. Analyzing such large volume of security alerts and extracting meaningful information from them is a difficult task.

Artificial intelligence and machine learning can be used to more quickly and efficiently analyze large volumes of security alerts. For example, an attack analyzer may use artificial intelligence and machine learning techniques to correlate multiple security alerts having similar features as being part of the same incident. This helps drastically reduce the number of records/events that need to be investigated, which in turn allows enterprises to mitigate and respond to security threats more quickly and decisively. It also reduces the risk of missing attacks buried in a big heap of security alerts.

Attacks can be largely divided into two types: targeted attacks and community attacks. Targeted attacks are attacks targeting a particular victim (e.g., a web application hosted by a particular enterprise). These attacks usually involve a reconnaissance phase where the attacker studies the target victim's infrastructure to find vulnerabilities that it can exploit. In contrast, community attacks are attacks that target multiple potential victims with the hope of finding a vulnerable victim. Sometimes community attacks are used for reconnaissance purposes (e.g., to find vulnerable victims). The attacker may use the results of the reconnaissance to subsequently form a targeted attack. Targeted attacks are less common than community attacks but are generally considered to be the more serious form of attack.

The ability to identify community attacks is important for security personnel. It helps prioritize which attacks to further investigate, helps evaluate the true risk to web applications, and helps identify an attack that could be a precursor to a more serious targeted attack.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
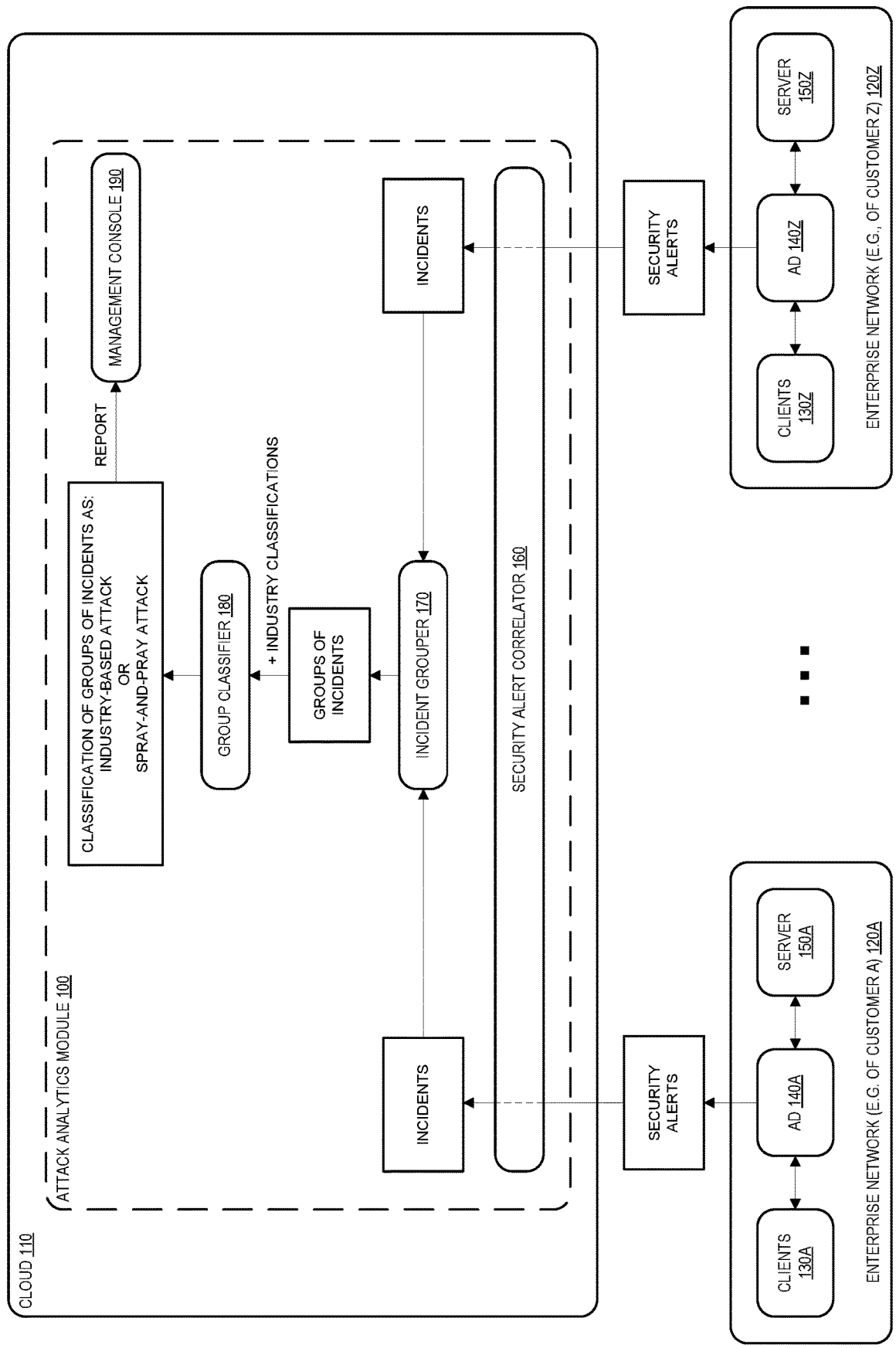
FIG. 1 is a block diagram illustrating a system for identifying and classifying community attacks, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video). Client end stations (e.g., server hardware, workstations, laptops, netbooks, palm tops, mobile phones, smartphones, multimedia phones, Voice Over Internet Protocol (VOIP) phones, user equipment (UE), terminals, portable media players, GPS units, gaming systems, set-top boxes) may execute an Hypertext Transfer Protocol (HTTP) client (e.g., a web browser) to access content and/or services provided over a Local Area Network (LAN), over the Internet, and/or over virtual private networks (VPNs) overlaid on (e.g., tunneled through) the Internet. The content and/or services are typically provided by one or more end stations (e.g., server end stations comprising server hardware) running a web application server and belonging to a service or content provider or end stations participating in a peer to peer service, and may include, for example, public web pages (e.g., free content, store fronts, search services), private web pages (e.g., username/password accessed web pages providing email services), and/or corporate networks over VPNs.

As used herein, a web application server is system software (running on top of an operating system) executed by server hardware upon which web applications run. Web application servers may include a web server (e.g. Apache, Microsoft® Internet Information Server (IIS), nginx, lighttpd), which delivers web pages on the request of HTTP clients using HTTP, and may also include an application server that executes procedures (i.e., programs, routines, scripts) of a web application. Web application servers typically include web server connectors, computer programming language libraries, runtime libraries, database connectors, and/or the administration code needed to deploy, configure, manage, and connect these components. Web applications are computer software applications made up of one or more files including computer code that run on top of web application servers and are written in a language the web application server supports. Web applications are typically designed to interact with HTTP clients by dynamically generating HTML responsive to HTTP request messages sent by those HTTP clients. Many web applications utilize databases (e.g., relational databases such as PostgreSQL, MySQL, and Oracle, and non-relational databases, also known as NoSQL databases, such as MongoDB, Riak, CouchDB, Apache Cassandra and HBase) to store information received from HTTP clients and/or information to be displayed to HTTP clients.

HTTP clients interact with web applications by transmitting HTTP request messages to web application servers, which execute portions of web applications and return web application data in the form of HTTP response messages back to the HTTP clients, where the web application data may be rendered using a web browser. Thus, HTTP functions as a request-response protocol in a client-server computing model, where the web application servers typically act as the "server" and the HTTP clients typically act as the "client."

FIG. 1 is a block diagram illustrating a system for identifying and classifying community attacks, according to some embodiments. As shown in the diagram, the system includes a cloud 110 and enterprise networks 120A-Z communicatively coupled to the cloud 110. Each enterprise network 120 includes a web application layer attack detector 140 (AD) communicatively coupled between clients 130A and a server 150. For example, enterprise network 120A includes web application layer attack detector 140A that is communicatively coupled between clients 130A and server 150A, while enterprise network 120Z includes web application layer attack detector 140Z that is communicatively coupled between clients 130Z and server 150Z. In one embodiment, each of the servers 150 is a web application server and each of the clients 130 is an HTTP client. While the diagram shows the clients 130 being located within an enterprise network 120, some clients 130 may be located outside of the enterprise network 120 and these clients 130 may access (or attempt to access) a server (e.g., server 150A or server 150Z) from outside an enterprise network 120.

Web application layer attack detector 140A is configured to protect server 150A against web application layer attacks from clients 130A (e.g., Structured Query Language injection (SQLi) attacks, Cross-Site Request Forgery (CSRF) attacks, and Remote File Inclusion (RFI) Attacks). Web application layer attack detector 140A can be implemented by one or more electronic devices. Web application layer attack detector 140A may sit inline to the traffic being sent between clients 130A and server 150A such that it can see the traffic being sent between clients 130A and server 150A. In one embodiment, web application layer attack detector 140A is a web application firewall and may be implemented as a reverse proxy that receives connection requests (e.g., Transmission Control Protocol (TCP) connection requests) from clients 130A on behalf of server 150A. Web application layer attack detector 140A may complete the connections with clients 130A (e.g., complete the TCP three-way handshake) and receive data streams carrying web application layer requests intended for server 150A over those connections. Web application layer attack detector 140A may also establish connections with the server 150A to send the received web application layer requests to server 150A.

Web application layer attack detector 140A may generate security alerts based on applying a set of security rules to traffic (e.g., web application layer messages) being sent between clients 130A and server 150A. A security alert may include a variety of types of information related to the packets or web application layer messages that triggered the alert (e.g., by meeting the conditions specified by one or more security rules), including but not limited to part or all of the web application layer messages themselves, "packet parts" that include information from packet headers of the packet(s) carrying the web application layer messages that meet the rule condition (e.g., source or destination IP addresses from an IP header, source or destination ports from a TCP header or UDP header, a Media Access Control (MAC) address or Virtual LAN (VLAN) identifier value from an Ethernet header, etc.), an identifier of the matched security rule having the condition met, part or all of the condition of the matched security rule, an attack type of the matched security rule, a category of the matched security rule, a set of violation indicators describing other flaws or departures from a proper protocol found in the packets, and/or a timestamp generated by the web application layer attack detector 140 indicating when the web application layer attack detector 140 received or processed the packet(s).

While the diagram shows web application layer attack detector 140A and server 150A being deployed in enterprise network 120A (on-premise), in some embodiments, web application layer attack detector 140A and/or server 150A may be deployed in the cloud 110 (e.g., a cloud provided by a cloud provider such as Amazon, Microsoft, etc.). In one example of an arrangement, web application layer attack detector 140A is deployed in the cloud 110 while server 150A is deployed on-premise, and any web application layer requests generated by clients 130A that are intended for server 150A are first directed to web application layer attack detector 140A in the cloud 110 (e.g., by changing Domain Name Service (DNS) records) before being sent to the on-premise server 150A. It should be understood that other arrangements are also possible (e.g., both web application layer attack detector 140A and server 150A may be deployed in the cloud 110).

While the diagram shows server 150A being protected by a single web application layer attack detector 140A, in some embodiments, server 150A may be protected using multiple web application layer attack detectors 140A (e.g., that are geographically dispersed). Attack detectors 140B-Z may perform similar operations as attack detector 140A but with respect to traffic being sent between their respective clients 130 and servers 150 (e.g., web application layer attack detector 140Z may generate security alerts based on applying a set of security rules to traffic being sent between clients 130Z and server 150Z), and thus are not further described to avoid repetition.

A web application layer attack detector 140 may be implemented as a separate component (e.g., the web application layer attack detector 140 may reside on a separate physical machine (sometimes referred to as a gateway) or a separate virtual machine (sometimes referred to as a remote agent or a remote sensor)) from the web application server 150 or fully or partially integrated as an in-process agent within the web application server 150 (i.e., the web application layer attack detector 140 is implemented as a loadable kernel component that is configured to see and analyze traffic being sent to and from a corresponding web application server 150). Also, as mentioned above, a web application layer attack detector 140 may be deployed in a cloud 110 (e.g., a cloud provided by a cloud provider such as Amazon, Microsoft, etc.) or on premise. For example, in-process agent web application layer attack detectors 140 may be deployed with the web application servers 150 in a cloud 110 (e.g., a private cloud, a cloud provided by a cloud provider such as Amazon) or in multiple clouds.

As shown in the diagram, the cloud 110 includes an attack analytics module 100 that is configured to analyze security alerts generated by web application layer attack detectors 140. The attack analytics module 100 can be implemented by one or more electronic devices (e.g., in the cloud 110). The services of the attack analytics module 100 may be provided by a company that provides cybersecurity products and/or data security services to customers. For example, the owner/operator of enterprise network 120A and the owner/operator of enterprise network 120Z may be customers (customer A and customer B, respectively) of the company that provides the services of the attack analytics module 100.

As shown in the diagram, the attack analytics module 100 includes a security alert correlator 160, an incident grouper 170, a group classifier 180, and a management console 190. The security alert correlator 160 may receive security alerts generated by an attack detector 140 and correlate/distill those security alerts into incidents, where each incident represents a group of security alerts that have been determined to be associated with the same security event (e.g., an attack or potential attack) based on having similar features. Each incident may be described using various features. In one embodiment, these features include the origin of the incident, the tool that was used to cause the incident, the type of attack involved in the incident, the target of the incident, and the timing of the incident, or any combination thereof. The origin of the incident may indicate the network source (e.g., source IP address and the class of the IP address (e.g., class B or class C), etc.) and/or the geographic source (e.g., subdivision, province, country, content distribution network (CDN) edge, etc.). In one embodiment, the origin of the incident is indicated using a histogram or distribution of origins. The tool that was used to cause the incident may indicate the client application that was used and/or the tool type. In one embodiment, the tool that was used to cause the incident is indicated using a histogram or distribution of client applications that were used. The target of the incident may indicate the host name of the target, the uniform resource locator (URL) of the target, the HTTP method (e.g., GET or POST), and/or parameters passed in the HTTP request. The type of attack involved in the incident may indicate the attack type (e.g., SQL injection, cross-site scripting (XSS) attack, an unauthorized resource access, bad bots, etc.) and/or the security rules that were triggered/violated. The timing of the incident may indicate the time when the incident occurred, the duration of the incident, and/or any time patterns of the incident (e.g., periodic properties of the incident).

The security alert correlator 160 may correlate/distill security alerts generated by multiple different web application layer attack detectors 140 into incidents. For example, the security alert correlator 160 may correlate/distill security alerts generated by web application layer attack detector 140A into incidents and also correlate/distill security alerts generated by web application layer attack detector 140B into incidents. In one embodiment, the security alert correlator 160 uses machine learning systems to correlate/distill security alerts into incidents. As used herein, incidents representing a group of security alerts generated by a web application layer attack detector 140 protecting a server 150 within an enterprise network 120 may be referred to as an incident occurring in that enterprise network 120.

The security alert correlator 160 may provide incidents occurring in multiple different enterprise networks to the incident grouper 170. For example, the security alert correlator 160 may provide incidents occurring in enterprise network 120A (e.g., which were generated based on grouping security alerts generated by attack detector 140A) and incidents occurring in enterprise network 120Z (e.g., which were generated based on grouping security alerts generated by attack detector 140Z) to the incident grouper 170. The incident grouper 170 may thus receive incidents occurring across multiple enterprise networks 120 (e.g., belonging to multiple customers).

The incident grouper 170 may group similar incidents (e.g., incidents having similar features) occurring across multiple enterprise networks 120 into one or more groups of incidents. Incidents may be grouped based on one or more features. For example, incidents having the same source IP address can be grouped together. As another example, incidents that occur during similar times, from the same client application, from the same country, and targeting the same URL may be grouped together. As another example, incidents that occur during similar times, from the same client application, having the same attack type, and from the same province may be grouped together. In one embodiment, as will be described in further detail below, the incident grouper 170 uses a clustering-based grouping algorithm to group incidents into groups. In another embodiment, as will be described in further detail below, the incident grouper 170 uses a rule-based grouping algorithm to group incidents into groups.

Once the incident grouper 170 groups the incidents into one or more groups of incidents, the incident grouper 170 may provide these groups to the group classifier 180. The incident grouper 170 may also provide industry classifications for each of the groups of incidents. The industry classification for a group of incidents indicates the industry/sector (e.g., banking, health, gaming, social media, etc.) that the group of incidents targeted. Each incident within a group of incidents may be assigned an industry classification based on which enterprise network 120 the incident occurred in and/or which application the incident targeted. For example, if the incident occurred in the enterprise network 120 of a bank or targeted a web application of the bank, then the industry classification of that incident may be determined as "banking." In one embodiment, the industry classification for a group of incidents is determined based on which industry is most prevalent among the incidents in that group. In one embodiment, the industry classification for a group is provided as a histogram/distribution of industry classifications of the incidents within that group.

The group classifier 180 may classify one or more of the groups of incidents it receives from the incident grouper 170 as being a community attack. As used herein, a community attack is an attack that targets more than one enterprise network 120 or web application. In one embodiment, the group classifier 180 may further classify groups of incidents classified as being a community attack as being an industry-based attack or a spray-and-pray attack. As used herein, an industry-based attack is an attack that targets a single industry, whereas a spray-and-pray attack is an attack that targets multiple industries. The group classifier 180 may classify a group of incidents based on the number of customers involved, the type of attack, and/or a histogram/distribution of industries. For example, a group of incidents that includes incidents occurring across a large number of different enterprise networks of different customers may indicate that the group is more likely to be a community attack (i.e., industry-based attack or spray-and-pray attack). As another example, a group of incidents that includes incidents involving a "bad bot" attack type may indicate that the group is more likely to be a community attack. As yet another example, if most of the incidents within a group of incidents are associated with a single industry, then this may indicate that the group is more likely to be an industry-based attack as opposed to a spray-and-pray attack. A high score in all three indicators mentioned above may indicate that the group is likely to be an industry-based attack. If only the first two indicators have high scores (large number of customers targeted and bad bot type of attack), then this may indicate that the group is likely a spray-and-pray attack. In one embodiment, the group classifier 180 classifies one or more groups of incidents as being a targeted attack. For example, the group classifier 180 may classify a group of incidents as being a targeted attack if the group of incidents was not classified as being a community attack (e.g., not an industry-based attack or spray-and-pray attack). In one embodiment, the group classifier 180 also determines a confidence value for each group of incidents that represents a confidence level that incidents in that group of incidents are indeed associated with the same attack or potential attack.

In one embodiment, the attack analytics module 100 generates and causes a report to be displayed by a management console 190 that indicates the results of the classification to a customer (e.g., customer A and/or customer Z) or other security personnel. In one embodiment, the report indicates whether an incident occurring in an enterprise network 120 is part of a group of incidents classified as being a community attack (and may further indicate whether this attack is classified as being an industry-based attack or spray-and-pray attack). The report may also indicate the features that are common among incidents within a group of incidents occurring across multiple enterprise networks. For example, the report may indicate that all incidents within a group of incidents have a particular source IP address. Customers may use this information to deploy security measures in their enterprise network 120 such as blocking traffic having that specific source IP address.

Also, a customer may use the results of the classifications to help identify false positive incidents. False positive incidents are incidents that do not represent actual attacks—it can be caused, for example, by bugs in the application code. It can be assumed that if an incident is part of a group of incidents classified as being a community attack (e.g., industry-based attack or spray-and-pray attack), then it has a low probability of being a false positive. Thus, if an incident is part of a group of incidents that was classified as being a community attack, then it is more likely to be a true positive (and not a false positive), and the customer can take appropriate security measures. The customer may further use this information to identify misconfigurations. A misconfiguration may exist when a security alert is generated but traffic that caused the security alert to be generated is not blocked. Thus, in cases where a security alert is generated for an incident that is part of a community attack (and thus the incident is likely a true positive), but the traffic is not blocked, then it is likely that there is a misconfiguration, and the customer can take appropriate measures to correct the misconfiguration.

Figure 2:
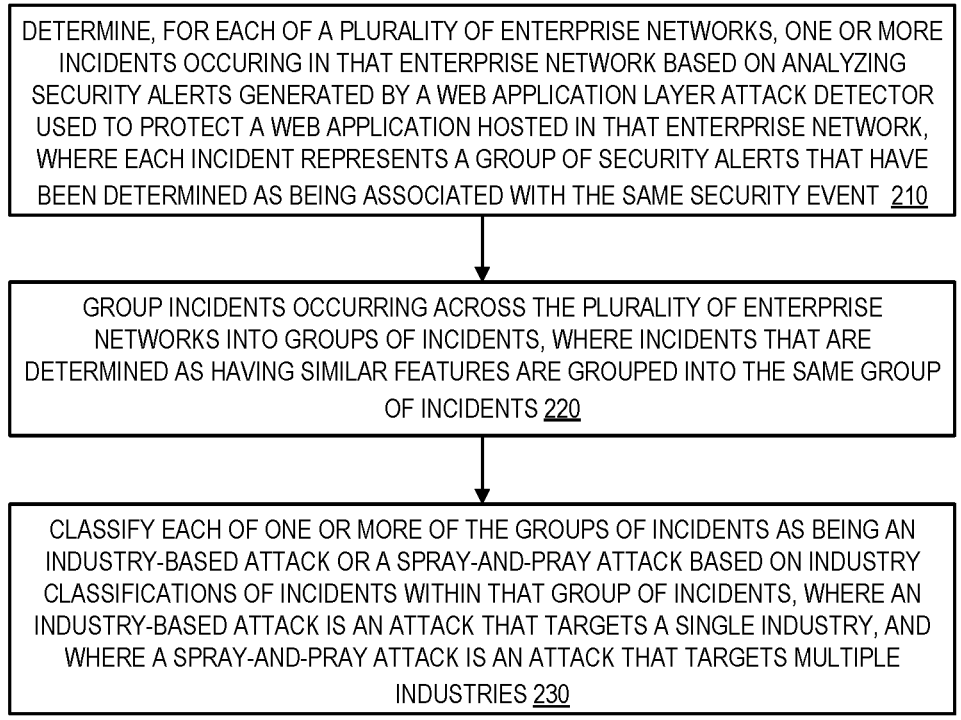
FIG. 2 is a flow diagram of a process for identifying and classifying community attacks, according to some embodiments.

FIG. 2 is a flow diagram of a process for identifying and classifying community attacks, according to some embodiments. In one embodiment, the process is implemented by one or more electronic devices implementing an attack analytics module 100. The operations in this and other flow diagrams have been described with reference to the example embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams. Similarly, while the flow diagrams in the figures show a particular order of operations performed by certain embodiments, it should be understood that such order is one example (e.g., alternative embodiments may perform the operations in a different order, combine certain operations, overlap certain operations, etc.).

At block 210, the attack analytics module determines, for each of a plurality of enterprise networks, one or more incidents occurring in that enterprise network based on analyzing security alerts generated by a web application layer attack detector used to protect a web application hosted in that enterprise network, where each incident represents a group of security alerts that have been determined as being associated with the same security event.

At block 220, the attack analytics module groups incidents occurring across the plurality of enterprise networks into groups of incidents, where incidents that are determined as having similar features are grouped into the same group of incidents. As will be described in additional detail below, the attack analytics module may group incidents into groups of incidents using a clustering-based grouping algorithm or a rule-based grouping algorithm.

At block 230, the attack analytics module classifies each of one or more of the groups of incidents as being an industry-based attack or a spray-and-pray attack based on industry classifications of incidents within that group of incidents, where an industry-based attack is an attack that targets a single industry, and wherein a spray-and-pray attack is an attack that targets multiple industries.

Figure 3:
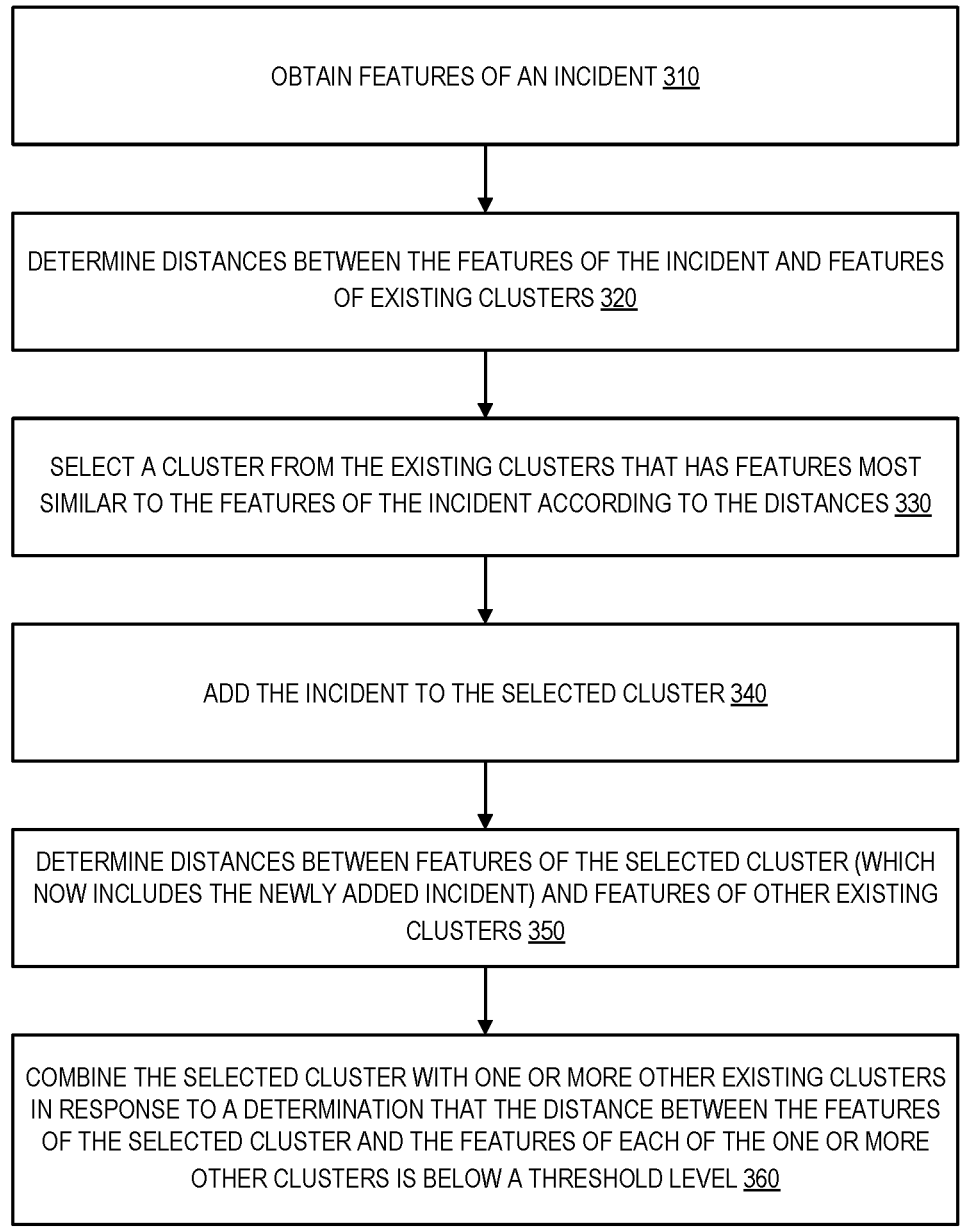
FIG. 3 is a flow diagram of a process for grouping incidents using a clustering-based grouping algorithm, according to some embodiments.

FIG. 3 is a flow diagram of a process for grouping incidents using a clustering-based grouping algorithm, according to some embodiments. In one embodiment, the process is implemented by an attack analytics module 100, and more specifically the incident grouper 170 of the attack analytics module 100.

At block 310, the incident grouper obtains features of an incident and at block 320, the incident grouper determines distances between the features of the incident and features of existing clusters. The distance between features indicates a measure of similarity between those features. In one embodiment, the incident grouper determines the distance between features based on applying a distance function to those features. In one embodiment, the incident grouper cleans and/or transforms the data describing the features before applying the distance function. For example, a URL may be separated into its basic components (e.g., host name, path, resource, and file type), patterns can be extracted from a URL, different subnets/classes are identified from the IP address (e.g., class B or class C), and/or geo-location is determined based on the IP address. The distance function may measure distance using various techniques. For example, for numeric values, the distance may be measured using Euclidian distance. For text, the distance may be measured using a discrete distance ('1' if equal and '0' if not equal) or Levenshtein distance (minimum number of character edits needed to change one text to another text). For IP addresses, the distance may be measured using geo-location distance. In one embodiment, the distance between IP addresses is measured as a weighted difference between each octet. For example, the distance (d) between IP addresses x4.x3.x3.x1 (IP1) and y4.y3.y2.y1 (IP2) may be defined as follows:

IP as 4-dimensional data (for IPv4):
IP1=x4.x3.x2.x1
IP2=y4.y3.y2.y1
Distance between IP1 and IP2:
$d(IP1,IP2)=(x1-y1)^2+10 \cdot (x2-y2)^2+100 \cdot (x3-y3)^2+1000 \cdot (x4-y4)^2$ In one embodiment, the distance between IP addresses is measured based on the size of the mutual prefix between the IP addresses in 32-bit representation. For example, the distance (d) between IP addresses may be defined as follows:
IP as 32-dimensional data (for IPv4):
IP1=11001011100001000011111101110101
IP2=11001100101010101010110100101011
$d(IP1,IP2)=1-(\text{size of mutual prefix}) \cdot \frac{1}{32}$ In one embodiment, the distance between histogram/distribution values (e.g., histogram/distribution of URLs, IP addresses, hots, timing, etc.) is measured using a cosine function or entropy. In general, the distance between sets of features may be measured as a weighted sum of the distances between each of the features. For example, the distance between two attacks (e.g., incidents and/or clusters) may be defined as follows:

Total distance between incidents/attacks
$\text{Distance}(\text{Incident\_1}, \text{Incident\_2}) = w_1 \cdot \text{distance}(IP_1, IP_2) + w_2 \cdot \text{distance}(URL_1, URL_2) + \ldots + w_d \cdot \text{distance}(\text{User-Agent}_1, \text{User-Agent}_2)$
d=number of features At block 330, the incident grouper selects a cluster from the existing clusters that has features most similar to the features of the incident according to the distances (e.g., the cluster having the minimum distance). At block 340, the incident grouper adds the incident to the selected cluster. At block 350, the incident grouper determines distances between features of the selected cluster (which now includes the newly added incident) and features of other existing clusters (e.g., using a distance function). At block 360, the incident grouper combines the selected cluster with one or more other existing clusters in response to a determination that the distance between the features of the selected cluster and the features of each of the one or more other clusters is below a threshold level. In one embodiment, the incident grouper may remove an incident from an existing cluster (e.g., because the incident is older than a threshold age). In one embodiment, the incident grouper may combine clusters following removal of an incident from an existing cluster.

Figure 4:
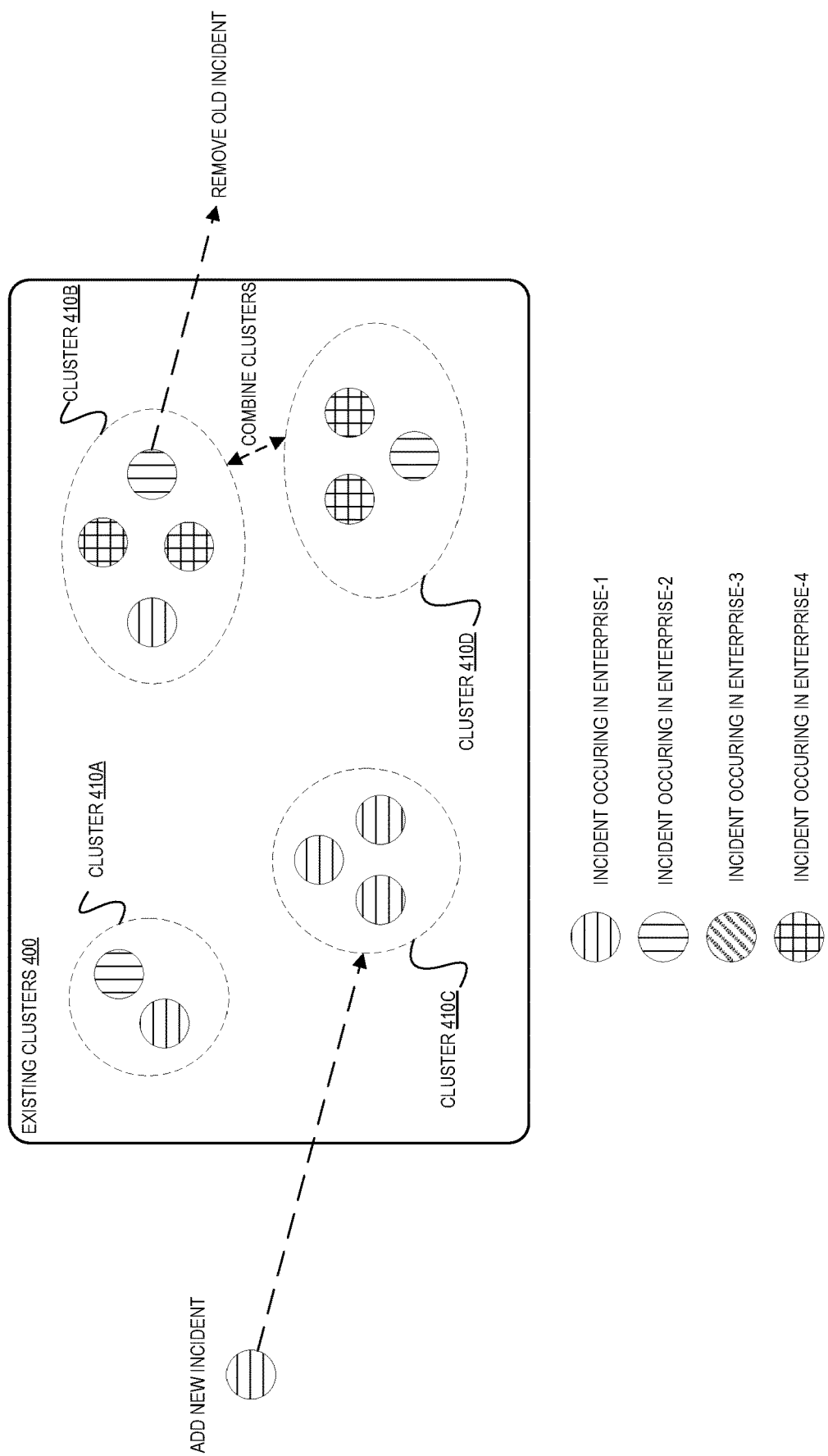
FIG. 4 is a diagram illustrating an incident being added to a cluster and another incident being removed from a cluster, according to some embodiments.

FIG. 4 is a diagram illustrating an incident being added to a cluster and another incident being removed from a cluster, according to some embodiments. The diagram shows existing clusters 400 which include cluster 410A, cluster 410B, cluster 410C, and cluster 410D. The incident grouper may have previously formed the existing clusters 410A-D based on processing previously received incidents using a clustering-based grouping algorithm. Each cluster may include incidents occurring in different enterprise networks. Each cluster 410 represents a group of incidents that have been determined as being associated with the same security event (e.g., an attack or a potential attack). In the diagram, incidents are shown as pattern-filled circles. The patterns in the circles represent the enterprise network in which the incident occurred. In one embodiment, when a new incident is received, the incident grouper 170 adds the new incident to one of the existing clusters 410 that has features most similar to the features of the new incident (e.g., the shortest distance according to a distance function). In this example, the new incident is shown as being added to cluster 410C. In one embodiment, a new incident may form a new cluster if its features are not similar enough to any existing clusters. In one embodiment, the incident grouper 170 can remove an incident from an existing cluster. For example, the incident grouper 170 may remove an incident from an existing cluster 410 if it determines that the incident is old (e.g., based on the creation time of the incident or the last modified time of the incident). In this example, an incident is shown as being removed from cluster 410B.

In one embodiment, after an incident is added to a cluster 410, the incident grouper 170 determines the distances between features of that cluster 410 (with the newly added incident) and all other clusters 410 and combines that cluster 410 (with the newly added incident) with one or more other clusters 410 if the distance between the features of that cluster (with the newly added incident) and the one or more other clusters 410 is below a threshold value. Clusters 410 may also be combined in a similar manner following removal of an incident from a cluster 410. For example, as shown in the diagram, after an incident is removed from cluster 410B, clusters 410B and 410C may be combined.

Figure 5:
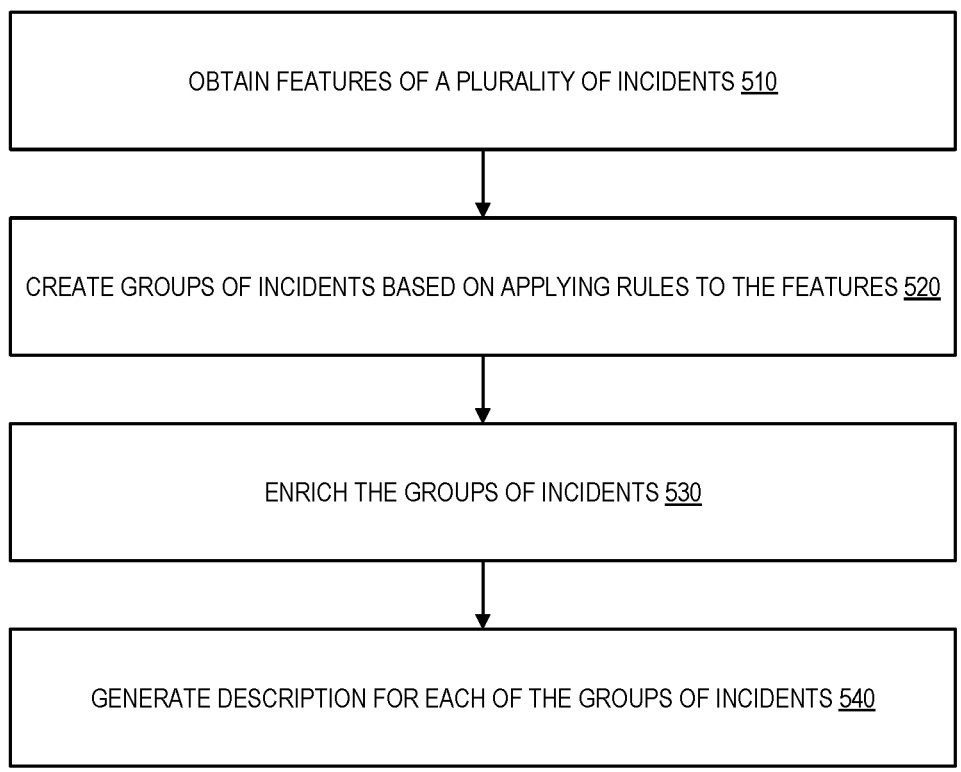
FIG. 5 is a flow diagram of a process for grouping incidents using a rule-based grouping algorithm, according to some embodiments.

FIG. 5 is a flow diagram of a process for grouping incidents using a rule-based grouping algorithm, according to some embodiments. In one embodiment, the process is implemented by an attack analytics module 100, and more specifically the incident grouper 170 of the attack analytics module 100.

Figure 6:
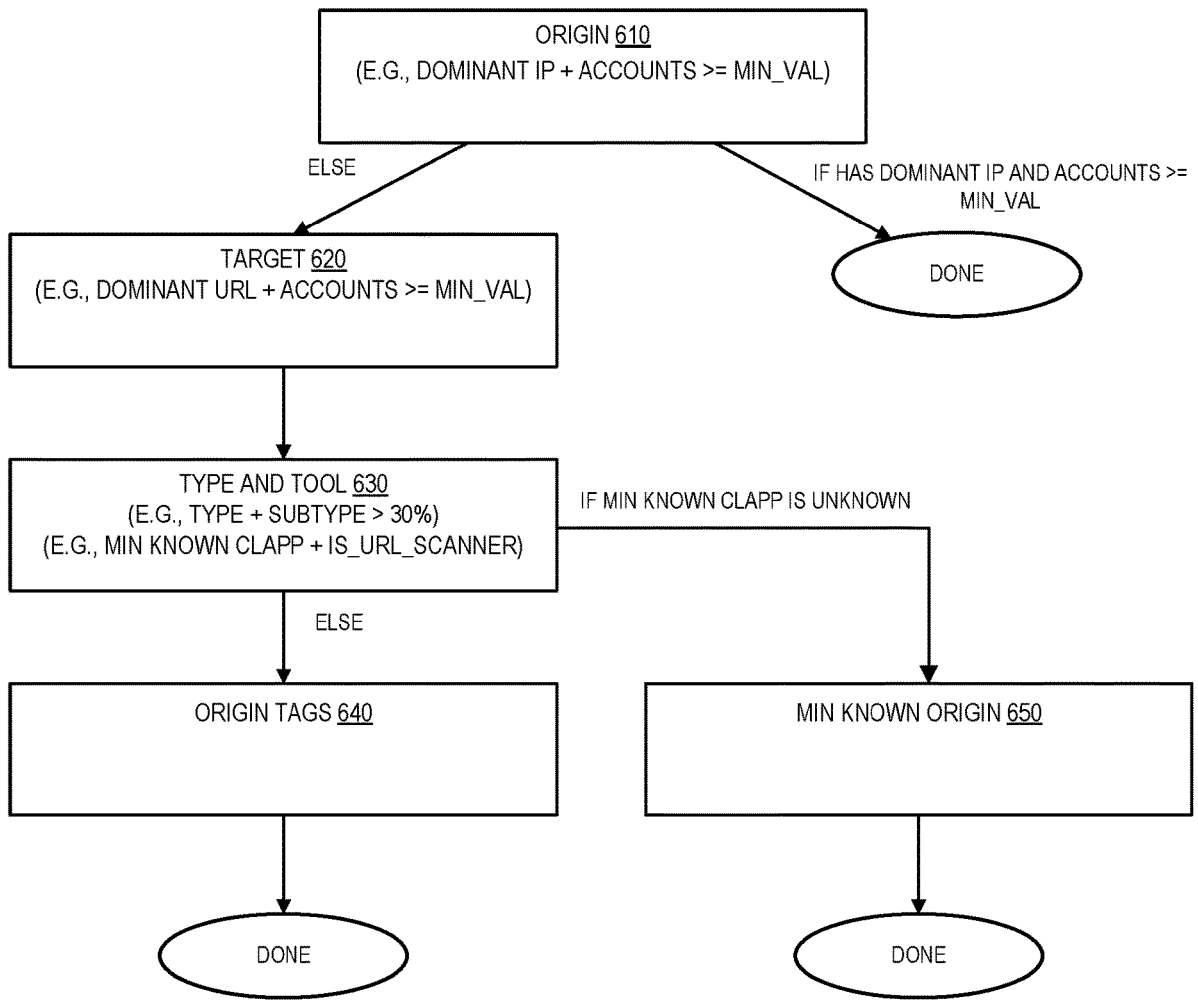
FIG. 6 is a diagram illustrating grouping stages of a rule-based grouping algorithm.

At block 510, the incident grouper obtains features of a plurality of incidents (e.g., occurring across multiple enterprises). In one embodiment, the incident grouper obtains features of a batch of incidents occurring during a specified period of time (e.g., the last N days). In one embodiment, one or more of the following features are obtained for each of those incidents:

a. General
  customer_id—account ID or site ID
  industry—industry classification
b. Type
  type—sorted list of attack_type (e.g. "Bad Bots, SQL Injection, XSS")
  subtype—most common attack subtypes
c. Tool
  clapp—client application
  clapp_type—client application type
  user_agent—user-agent
  tool—the 'minimum known clapp':
  clapp
  if (clapp is not unknown or None)
  else clapp_type
  if (clapp_type is not ' CLAPP_TYPE_UNKNOWN' or None)
  else user_agent
  if (user_agent is not None)
  else 'UNKNOWN'
  url_scanner—True if attacker performed URL scan
d. Origin
  IP address
  class_c—Class C subnet
  subdivision
  country
  origin—the 'minimum known origin':
  IP
  if (IP is not None)
  else class_c
  if (class_c is not None)
  else subdivision
  if (subdivision is not None or 'N/A')
  else country
  if (country is not None or 'N/A')
  else 'Few IPs'
  if (attack was made from few IP sources)
  else 'Distributed Origin'
  if (attack was made from a distributed source)
  else
  None e. Target
  URL
  method At block 520, the incident grouper creates groups of incidents based on applying rules to the features. For example, the incident grouper may group incidents by applying a rule that groups incidents having the same source IP address, targeting the same URL, and originating from the same country into the same group. In one embodiment, the incident grouper creates groups using multiple grouping stages. For example, FIG. 6 is a diagram illustrating grouping stages of a rule-based grouping algorithm. In the beginning, all incidents are in the same group. In each grouping stage, the incident grouper may split off incidents into a separate group based on those incidents having common features. As shown in FIG. 6, in the first grouping stage the incident grouper groups incidents based on origin (block 610). For example, in the first stage, the incident grouper may check whether there are incidents having the same source IP address (dominant IP address) and that occur for a large number of customers (number of customer accounts is greater than or equal to min_val). If so, then such incidents are grouped together. For the remaining incidents, the incident grouper proceeds to the next stage where it groups those incidents based on target URL (block 620). In this stage, the incident grouper may check, for example, whether there are incidents targeting the same URL (dominant URL) and that occur for a large number of customers (number of customer accounts is greater than or equal to min_val). If so, then such incidents are grouped together. For the remaining incidents, the incident grouper proceeds to the next stage, where it groups those incidents based on attack type and tool (block 630). In this stage, the incident grouper may check, for example, whether there are incidents associated with the same attack type (and subtype) and/or caused by the same tool (e.g., client application (CLAPP)). If so, then such incidents are grouped together. For the remaining incidents, the incident grouper proceeds to the next stage where it groups those incidents based on different origin features (blocks 640 and 650) depending on whether the tool is known.

In one embodiment, as the incident grouper proceeds through the different stages, it maintains a group dictionary describing the features of the group. For example, if a group was created based on incidents having common IP address of "1.1.1.1", then {'Dominant_IP': '1.1.1.1'} may be added to the group dictionary. The information in the group dictionary can be used, for example, to create a readable description of the group. Details of the example grouping stages shown in FIG. 6 are provided below.

a. Group By Origin (IP)

---

• group-by features: IP
• group dictionary: {'Dominant_IP': <IP>}  if <IP> is not None and
                                            #accounts>=min(spray_and_
                                            pray_accounts_grade_min_
                                            value, industry_accounts_
                                            grade_min_value)
• Notes:
  - Groups with no IP or number of accounts smaller than the threshold will be joined.
  - If group has a dominant IP, then group is done, else go to stage b.

b. Group By Target (URL)

- group-by features: URL
- group dictionary: {'URL': <URL>}  if <URL> is not None and #accounts>= min(spray_and_pray_accounts_grade_min_value,industry_accounts_grade_min_value)
- Notes:
  - Groups with no URL or number of accounts smaller than the threshold will be joined.

c. Group By Type & Tool

- group-by features: type, subtype, tool, url_scanner
- group dictionary: {'type': <type>, 'subtype': <subtype>, 'tool': <tool>, 'url_scanner': <url_scanner>} d. Group By Origin

- group-by features: origin if tool is 'UNKNOWN'
    else
    origin_tags (which is a list of properties describing the origin of the attack (e.g., single IP, single class C, single subdivision, single country, single autonomous system number (ASN), dominant IP, few IPs, distributed origin, etc.)
- group dictionary: {'origin': <origin>} if tool is 'UNKNOWN'
    else
    {'origin_tags': <origin_tags>} e. Group Creation
For each group of incidents create a group with the following fields:
  ID
  List of incidents
  Customer_ID Counter
  Industry Counter
  Group dictionary
  Shiny sentence
  Story grade
  Size grade
  Combined grade
  Confidence Returning to FIG. 5, at block 530, the incident grouper enriches the groups of incidents. For example, the groups of incidents may be enriched with additional features that were not captured above using the rule-based algorithm (e.g., if all incidents within a group share that feature). In one embodiment, the groups that were created in the first stage (i.e., stage "a. By Origin (IP)"), which only have "Dominant_IP" in their dictionary, are distinguished from the other groups for enrichment purposes. For example, the possible features with which a group may be enriched may be determined as follows:

```
If 'Dominant_IP' in group dictionary:
    features_to_add = ['url', 'tool', 'type', 'subtype', 'origin', 'origin_tags',
        'url_scanner', 'method', 'ip', 'class_c', 'subdivision', 'country', 'clapp',
        'clapp_type', 'user_agent']
Else:
    features_to_add = ['origin_tags', 'method', 'ip', 'class_c', 'subdivision',
        'country', 'clapp', 'clapp_type', 'user_agent']
```

In one embodiment, any feature that is shared by all of the incidents within a group of incidents is added to the group dictionary. For example, the group dictionary can be updated based on the following pseudocode:

```
For each group in groups:
    For each property in features_to_add:
        If (property not in group.dictionary) and (is_shared(property,group)):
            group.dictionary.update( {property: group[property]} )
```

In one embodiment, at block 540, the incident grouper generates a description for each of the groups of incidents. The description may be a human-readable description that describes the shared/dominant features of the incidents within that group. For example, the description (also referred to herein as a "shiny sentence") for a group may be generated based on the following pseudocode:

```
• origin_and_type:
    If 'Dominant_IP' in group dictionary:
        origin_ip = "Single IP " + <Dominant_IP>
        origin_geo = "from " + <subdivision/country>
                if subdivision or country in group dictionary
                else ""
        type = " doing " + <type>
            if type in group dictionary
            else ""
        subtype = " (" + <subtype> + ")"
            if type and subtype in group dictionary
            else ""
        origin_and_type = origin_ip + origin_geo + type + subtype
    Else:
        type = <type> + "attack"
            if type in group dictionary
        subtype = " (" + <subtype> + ")"
            if type and subtype in group dictionary
        origin_start = " from"
                if class_c,subdivision or country in group dictionary
                else ""
        origin_class = " " + <class_c>
                if class_c in group dictionary
                else ""
        origin_geo = " located in " + <subdivision/country>
                if class_c in group dictionary and subdivision/country
                in group dictionary
                else " " + <subdivision/country>
                if subdivision/country in group dictionary
                else ""
        origin_and_type = type + subtype + origin_start + origin_class +
                    origin_geo
• tool
    tool = ""
    if clapp in group dictionary or clapp_type in group dictionary:
        if clapp in group dictionary and <clapp> is not unknown:
            clapp_name = get_clapp_name(<clapp>)
            if clapp_name[1] == 'Unknown':
                    tool = ' using unknown bot'
            else:
                    tool = ' using ' + clapp_name[0] + ' ' + clapp_name[1]
        else if 'UNKNOWN' not in <clapp_type>:
            tool = ' with ' + <clapp_type>
• target
    target = ""
    if url in group dictionary:
        target += ' on ' + <url>
    if 'method' in group dictionary:
        target += ' with ' + <method> + 'method'
    if url_scanner in group dictionary and <url_scanner>:
        if 'doing' in target:
            target += ' while'
        target += ' doing URLs scan'
• shiny sentence
    shiny_sentence = origin_and_type + tool + target
• remove sequential equals words
    fix clapp and clapp_type are the same (e.g. spambot spambot):
    shiny_sentence = regex.sub(r'\b(.+)\s+\1\b', r'\1', shiny_sentence)
```

In general, the clustering-based grouping algorithm is more accurate than the rule-based grouping algorithm. Also, the clustering-based grouping algorithm can be performed incrementally as new incidents are received (i.e., dynamic mode) instead of being performed on a batch of incidents. However, it typically requires significantly more computation due to the frequent use of the distance function. The rule-based grouping algorithm generates few false positives and can be computed quickly. However, the rule-based grouping algorithm has a tendency to separate clusters and thus might miss some community attacks.

Figure 7:
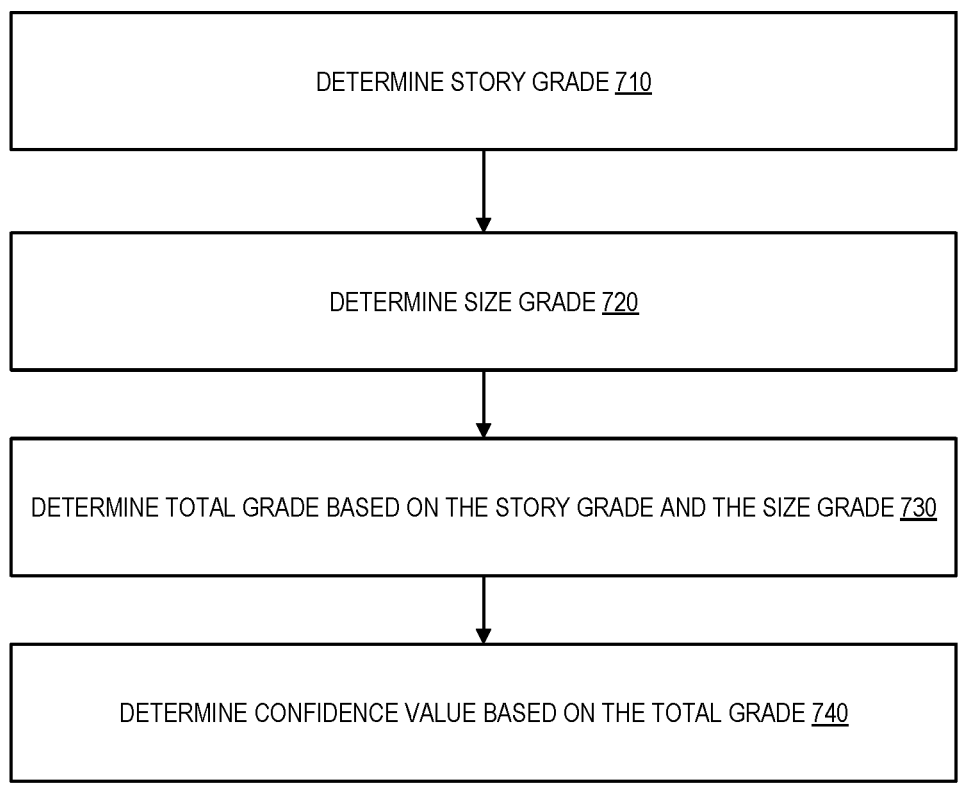
FIG. 7 is a flow diagram of a process for determining a confidence value for a group of incidents classified as being a spray-and-pray attack, according to some embodiments.

FIG. 7 is a flow diagram of a process for determining a confidence value for a group of incidents classified as being a spray-and-pray attack, according to some embodiments. In one embodiment, the process is implemented by an attack analytics module 100, and more specifically the group classifier 180 of the attack analytics module 100.

At block 710, the group classifier determines a story grade for the group of incidents. The story grade for the group of incidents represents a measure of how closely incidents within that group are related. In one embodiment, the story grade (on a scale of 0 to 10) for a group of incidents is determined based on the following pseudocode:

```
For each group in groups:
    # dominant_ip --> 10 (the best group story)
    If Dominant_IP in group dictionary:
        story_grade = 10
    # same url, type, and class c --> 9 (small number of groups, but
    still very strong)
    Else if url in group dictionary and class_c in group dictionary:
        story_grade = 9
    # same url, clapp, and type while origin tags are similar (3.5dim) -->
    8 (most of the cases after same dominant ip)
    Else if url in group dictionary and not 'UNKNOWN' in <tool>:
        story_grade = 8
    # same URL, type, subdivison --> 7 (small number of groups)
        Else if url in group dictionary and 'UNKNOWN' in <tool> and
        subdivision in groupdictionary:
            story_grade = 7
    # in any case, if the same class c --> at least 6
    Else if class_c in group dictionary:
        story_grade = 6
    # same URL, type, country --> 6 (small number of groups)
    Else if url in group dictionary and 'UNKNOWN' in <tool> and
    country in group dictionary:
        story_grade = 6
    # same tool and type, while origin tagging are similar (2.5dim) --> 4
    Else if url not in group dictionary and 'UNKNOWN' not in <tool>
    and any(substring in <origin_tags> for substring in ["Single IP",
    "Dominant IP", "Single Class C", "Single Subdivision"]):
        story_grade = 4
    # same type, subdivison --> 2 (rare)
    Else if url not in group dictionary and ('UNKNOWN' in <tool> and
    subdivision in group dictionary or 'UNKNOWN' not in <tool> and
    country in group dictionary):
        story_grade = 2
    Else:
        story_grade = 0
If 'Dominant_IP' not in group dictionary and type='Bad Bots':
    story_grade *= grouping_bad_bots_grade_story_decay
```

Figure 8:
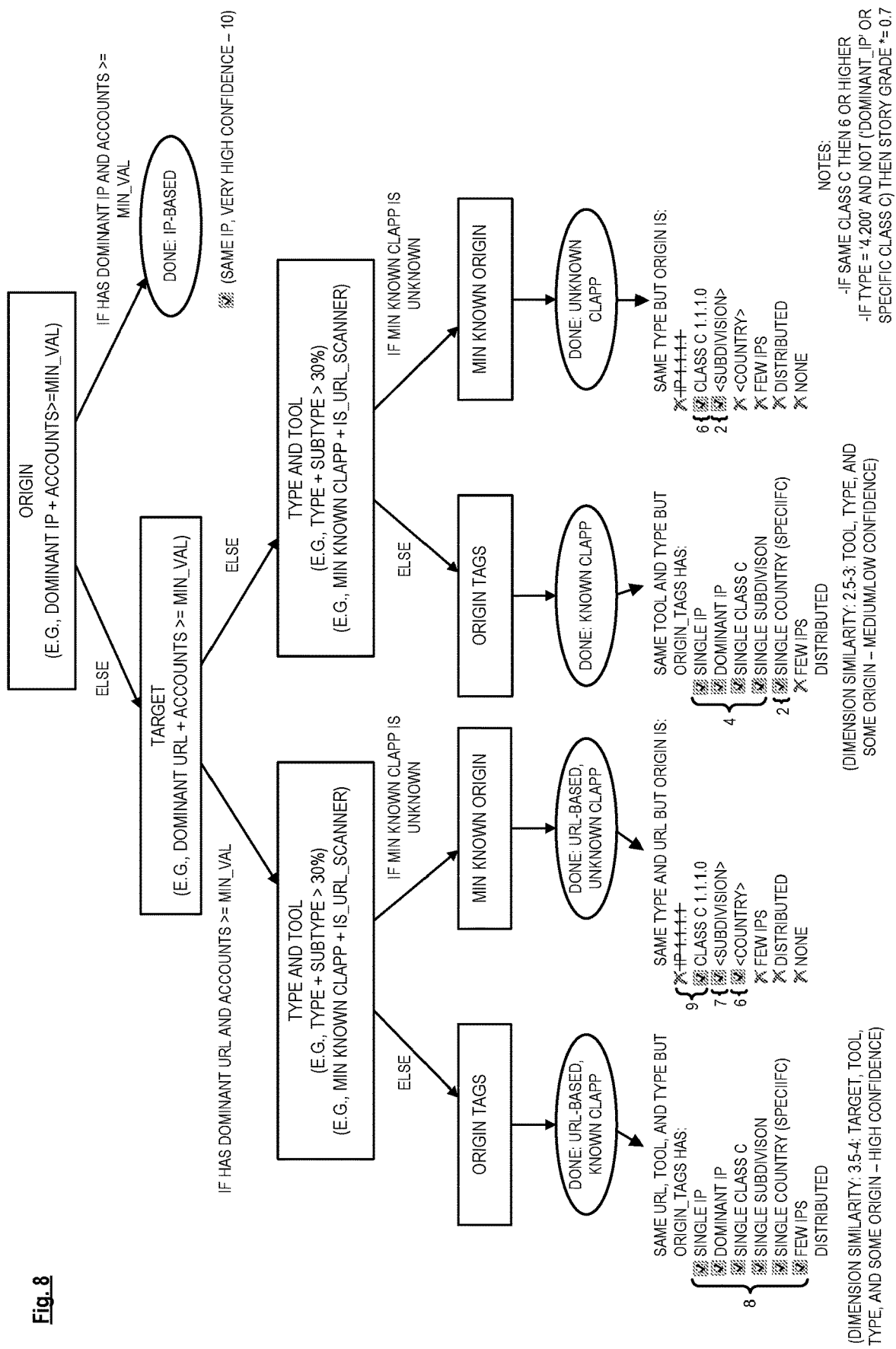
FIG. 8 is a diagram illustrating story grades for different paths taken in the grouping stages, according to some embodiments.

FIG. 8 is a diagram illustrating story grades for different paths taken in the grouping stages, according to some embodiments. The check marks shown in the diagram represent a valid story (i.e., incidents in the group are likely to be related to the same security event). The number next to the brackets encompassing the check marks is the story grade. The "X" marks shown in the diagram represent an invalid story (story grade is 0). As shown in the diagram, a group of incidents with "Dominant_IP" always has a story grade of 10, while a group of incidents with no "Dominant_IP" but with URL and tool "UNKNOWN" and the same specific subdivision has a story grade of 7. In one embodiment, groups with the same class C have a minimum story grade of 6 or higher. In one embodiment, the story grade for groups with attack type "Bad Bots" is decayed by a factor.

Returning to FIG. 7, at block 720, the group classifier determines a size grade for the group of incidents. The size grade for the group of incidents represents a measure of the number of accounts (i.e., customers) involved in that group. In one embodiment, the size grade for a group of incidents is determined based on the following pseudocode:
For each group in groups:
min_val=spray_and_pray_accounts_grade_min_value
max_val=spray_and_pray_accounts_grade_max_value $$S\&P\_size\_grade = \begin{cases} 0 & \text{if \#accounts} < \text{min\_val} \\ 10 & \text{if \#accounts} > \text{max\_val} \\ \max\left(1, \text{int}\left(10.0 \cdot \frac{\text{\#accounts} - \text{min\_val}}{\text{max\_val} - \text{min\_val}}\right)\right) & \text{else} \end{cases}$$

At block 730, the group classifier determines a total grade for the group of incidents based on the story grade and the size grade. The total grade for the group of incidents represents a measure of the likelihood that the group is a spray-and-pray attack. In one embodiment, the total grade for the group of incidents is determined as a weighted arithmetic mean of the story grade and the size grade. For example, the total grade for a group of incidents may be determined based on the following pseudocode:
For each group in groups:

weight = srpay_and_pray_story_grade_weight $$S\&P\_total\_grade = \begin{cases} 0 & \text{if story\_grade} = 0 \text{ or size\_grade} = 0 \\ \text{weight} \cdot \text{story\_grade} + \\ (1 - \text{weight}) \cdot \text{size\_grade} & \text{else} \end{cases}$$

At block 740, the group classifier determines a confidence value based on the total grade. The confidence value for the group of incidents represents a level of confidence that the group is a spray-and-pray attack. In one embodiment, the confidence value for a group of incidents is determined based on the following pseudocode:
For each group in groups:
low_threshold=grouping_total_grade_low_min_threshold
medium_threshold=grouping_total_grade_medium_min_threshold
high_threshold=grouping_total_grade_high_min_threshold $$S\&P\_confidence = \begin{cases} \text{""} & \text{if } S\&P\_story\_grade = 0 \text{ or } S\&P\_size\_grade = 0 \\ \text{"Low"} & \text{if low\_threshold} \leq S\&P\_total\_grade < \text{medium\_threshold} \\ \text{"Medium"} & \text{if medium\_threshold} \leq S\&P\_total\_grade < \text{high\_threshold} \\ \text{"High"} & \text{if high\_threshold} \leq S\&P\_total\_grade \\ \text{"Weak"} & \text{else} \end{cases}$$

Figure 9:
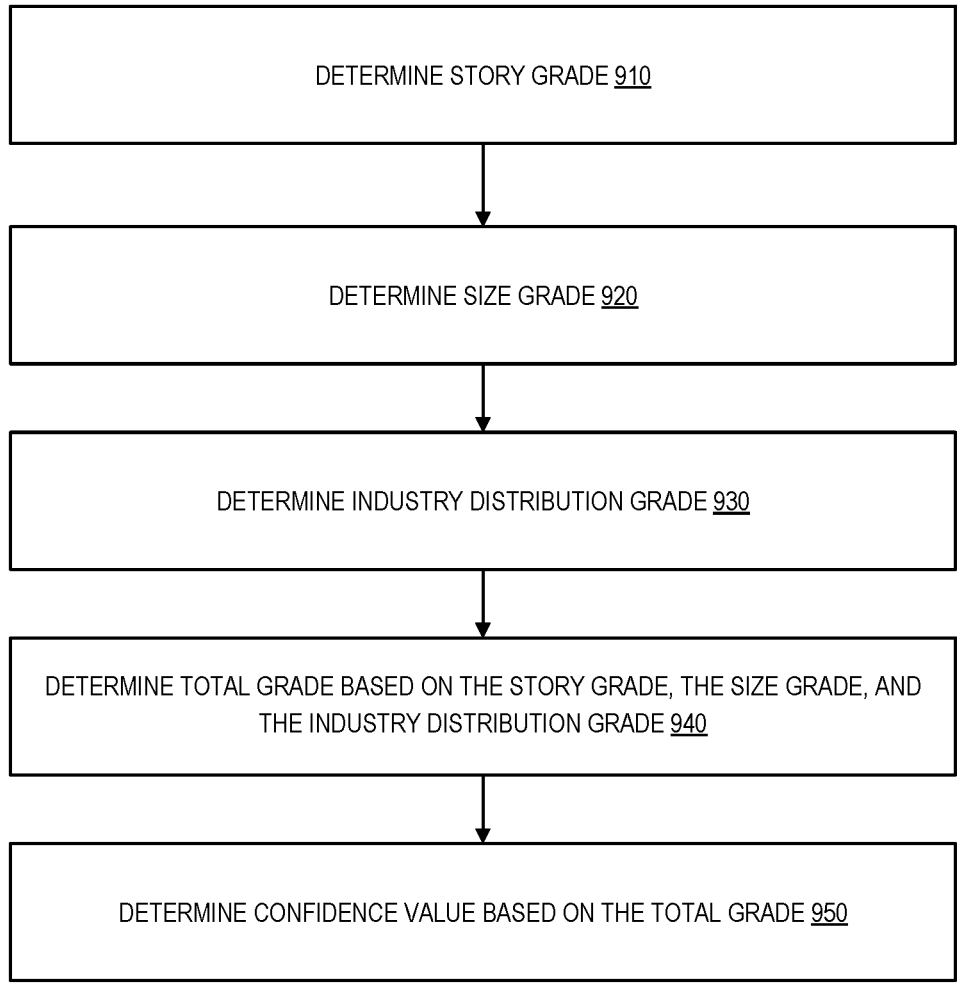
FIG. 9 is a flow diagram of a process for determining a confidence value for a group of incidents classified as being an industry-based attack, according to some embodiments.

FIG. 9 is a flow diagram of a process for determining a confidence value for a group of incidents classified as being an industry-based attack, according to some embodiments. In one embodiment, the process is implemented by an attack analytics module 100, and more specifically the group classifier 180 of the attack analytics module 100.

At block 910, the group classifier determines a story grade for the group of incidents. The story grade can be determined using the same or similar technique used to determine the story grade as described above with reference to block 710 of FIG. 7.

At block 920, the group classifier determines a size grade for the group of incidents. The size grade for the group of incidents represents a measure of the number of accounts (i.e., customers) involved in that group. In one embodiment, the size grade for a group of incidents is determined based on the following pseudocode:

For each group in groups:
min_val=industry_size_grade_min_value
max_val=industry_size_grade_max_value $$\text{industry\_size\_grade} = \begin{cases} 0 & \text{if \#accounts} < \text{min\_val} \\ 10 & \text{if \#accounts} > \text{max\_val} \\ \max\left(1, \text{int}\left(10.0 \cdot \frac{\text{\#accounts} - \text{min\_val}}{\text{max\_val} - \text{min\_val}}\right)\right) & \text{else} \end{cases}$$

At block 930, the group classifier determines an industry distribution grade for the group of incidents. The industry distribution grade for the group of incidents represents a measure of the homogeneity of the industry classifications of the industries within that group. In one embodiment, the industry distribution grade for a group of incidents is determined based on the following pseudocode:

For each group in groups:
min_val=industry_hist_grade_min_value
max_val=industry_hist_grade_max_value
leading_percent=the leading industry percent in the group $$\text{industry\_dist\_grade} = \begin{cases} 0 & \text{if leading industry is None/Reseller} \\ 0 & \text{if leading\_percent} < \text{min\_val} \\ 10 & \text{if leading\_percent} > \text{max\_val} \\ \max(1, \text{int} \\ \left(10.0 \cdot \frac{\text{leading\_percent} - \text{min\_val}}{\text{max\_val} - \text{min\_val}}\right)) & \text{else} \end{cases}$$

At block 940, the group classifier determines a total grade for the group of incidents based on the story grade, the size grade, and the industry distribution grade. The total grade for the group of incidents represents a measure of the likelihood that the group is an industry-based attack. In one embodiment, the total grade for the group of incidents is determined as a weighted arithmetic mean of the story grade, the size grade, and the industry distribution grade. For example, the total grade for a group of incidents may be determined based on the following pseudocode:

For each group in groups:
weight_story=industry_story_grade_weight
weight_distribution=industry_distribution_grade_weight Industry_total_grade =

$$\begin{cases} 0 & \text{if story\_grade} = 0 \text{ or} \\ & \text{size\_grade} = 0 \text{ or} \\ & \text{dist\_grade} = 0 \\ \text{weight\_story} \cdot \text{story\_grade} + \\ \text{weight\_distribution} \cdot \text{distribution\_grade} + & \text{else} \\ (1 - \text{weight\_story} - \text{weight\_distribution}) \cdot \\ \text{size\_grade} \end{cases}$$

At block 950, the group classifier determines a confidence value based on the total grade. The confidence value for the group of incidents represents a level of confidence that the group is an industry-based attack. In one embodiment, the confidence value for a group of incidents is determined based on the following pseudocode:

For each group in groups:
low_threshold=grouping_total_grade_low_min_threshold
medium_threshold=grouping_total_grade_medium_min_threshold
high_threshold=grouping_total_grade_high_min_threshold Industry_confidence=

$$\begin{cases} \text{""} & \text{if Industry\_story\_grade} = 0 \text{ or} \\ & \text{Industry\_size\_grade} = 0 \\ & \text{Industry\_dist\_grade} = 0 \\ \text{"Low"} & \text{if low\_threshold} \leq \text{Industry\_total\_grade} < \text{medium\_threshold} \\ \text{"Medium"} & \text{if medium\_threshold} \leq \text{Industry\_total\_grade} < \text{high\_threshold} \\ \text{"High"} & \text{if high\_threshold} \leq \text{Industry\_total\_grade} \\ \text{"Weak"} & \text{else} \end{cases}$$

Figure 10:
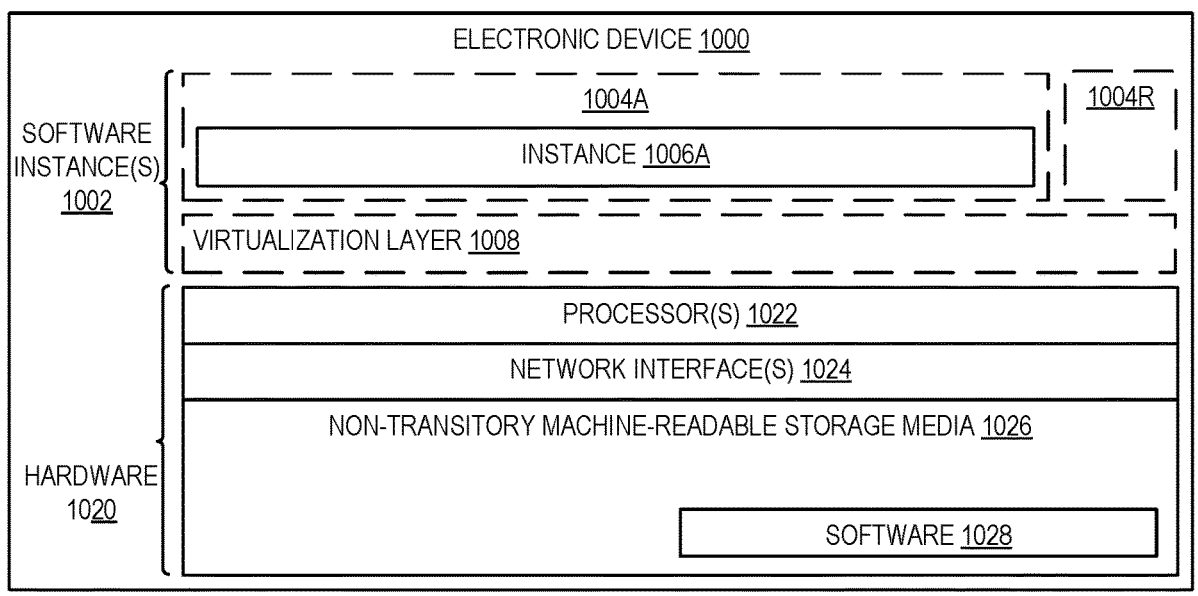
FIG. 10 is a block diagram illustrating an electronic device, according to some embodiments.

FIG. 10 is a block diagram illustrating an electronic device, according to some embodiments. FIG. 10 shows hardware 1020 comprising a set of one or more processor(s) 1022, a set of one or more network interfaces 1024 (wireless and/or wired), and non-transitory machine-readable storage media 1026 having stored therein software 1028 (which includes instructions executable by the set of one or more processor(s) 1022). Software 1028 can include code, which when executed by hardware 1020, causes the electronic device 1000 to perform operations of one or more embodiments described herein. Thus, as previously described, the attack analytics module 100 may be implemented in one or more electronic devices. Also, the clients 130, the servers 150, and the web application layer attack detectors 140 may each be implemented in different electronic devices.

In electronic devices that use compute virtualization, the set of one or more processor(s) 1022 typically execute software to instantiate a virtualization layer 1008 and software container(s) 1004A-R (e.g., with operating system-level virtualization, the virtualization layer 1008 represents the kernel of an operating system (or a shim executing on a base operating system) that allows for the creation of multiple software containers 1004A-R (representing separate user space instances and also called virtualization engines, virtual private servers, or jails) that may each be used to execute a set of one or more applications; with full virtualization, the virtualization layer 1008 represents a hypervisor (sometimes referred to as a virtual machine monitor (VMM)) or a hypervisor executing on top of a host operating system, and the software containers 1004A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1028 (illustrated as instance 1006A) is executed within the software container 1004A on the virtualization layer 1008. In electronic devices where compute virtualization is not used, the instance 1006A on top of a host operating system is executed on the "bare metal" electronic device 1000. The instantiation of the instance 1006A, as well as the virtualization layer 1008 and software containers 1004A-R if implemented, are collectively referred to as software instance(s) 1002.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more electronic devices for identifying and classifying community attacks, the method comprising:
   determining, for each of a plurality of enterprise networks, one or more incidents occurring in that enterprise network based on analyzing security alerts generated by a web application layer attack detector used to protect a web application hosted in that enterprise network, wherein each incident represents a group of security alerts that have been determined as being associated with the same security event;
   grouping the incidents occurring across the plurality of enterprise networks into groups of incidents, wherein incidents that are determined as having similar features are grouped into the same group of incidents;
   classifying each of one or more of the groups of incidents as being an industry-based attack or a spray-and-pray attack based on industry classifications of incidents within that group of incidents, wherein an industry-based attack is an attack that targets a single industry, and wherein a spray-and-pray attack is an attack that targets multiple industries; and
   determining, for a group of incidents classified as being an industry-based attack, a confidence value representing a measure of confidence that the group of incidents is an industry-based attack based on a story grade, a size grade, and an industry distribution grade, wherein the story grade represents a measure of how closely incidents within the group of incidents are related, the size grade represents a measure of a number of enterprise networks involved in the group of incidents, and the industry distribution grade represents a measure of homogeneity of the industry classifications of the incidents within the group of incidents.

2. The method of claim 1, further comprising:
   causing a result of the classifying to be displayed by a management console.

3. The method of claim 1, wherein the grouping is performed using a clustering-based grouping algorithm.

4. The method of claim 3, wherein the clustering-based grouping algorithm uses a distance function to measure similarity of one or more features between incidents.

5. The method of claim 4, wherein the one or more features include one or more of: an origin of an incident, a tool used to cause an incident, a type of attack associated with an incident, a target of an incident, and timing of an incident.

6. The method of claim 3, further comprising:
   classifying a particular group of incidents from the groups of incidents as being a targeted attack in response to a determination that the particular group of incidents is not classified as being an industry-based attack or spray-and-pray attack.

7. The method of claim 1, wherein the grouping is performed using a rule-based grouping algorithm.

8. The method of claim 1, further comprising:
   determining, for each of the one or more groups of incidents classified as being a spray-and-pray attack, a confidence value representing a measure of confidence of that group being a spray-and-pray attack.

9. A set of one or more non-transitory machine-readable storage media storing instructions which, when executed by one or more processors of one or more electronic devices, cause the one or more electronic devices to perform operations for identifying and classifying community attacks, the operations comprising:

determining, for each of a plurality of enterprise networks, one or more incidents occurring in that enterprise network based on analyzing security alerts generated by a web application layer attack detector used to protect a web application hosted in that enterprise network, wherein each incident represents a group of security alerts that have been determined as being associated with the same security event;

grouping the incidents occurring across the plurality of enterprise networks into groups of incidents, wherein incidents that are determined as having similar features are grouped into the same group of incidents;

classifying each of one or more of the groups of incidents as being an industry-based attack or a spray-and-pray attack based on industry classifications of incidents within that group of incidents, wherein an industry-based attack is an attack that targets a single industry, and wherein a spray-and-pray attack is an attack that targets multiple industries; and determining, for a group of incidents classified as being an industry-based attack, a confidence value representing a measure of confidence that the group of incidents is an industry-based attack based on a story grade, a size grade, and an industry distribution grade, wherein the story grade represents a measure of how closely incidents within the group of incidents are related, the size grade represents a measure of a number of enterprise networks involved in the group of incidents, and the industry distribution grade represents a measure of homogeneity of the industry classifications of the incidents within the group of incidents.

10. The set of one or more non-transitory machine-readable storage media of claim 9, wherein the operations further comprise:

causing a result of the classifying to be displayed by a management console.

11. The set of one or more non-transitory machine-readable storage media of claim 9, wherein the grouping is performed using a clustering-based grouping algorithm.

12. The set of one or more non-transitory machine-readable storage media of claim 11, wherein the clustering-based grouping algorithm uses a distance function to measure similarity of one or more features between incidents.

13. The set of one or more non-transitory machine-readable storage media of claim 12, wherein the one or more features include one or more of: an origin of an incident, a tool used to cause an incident, a type of attack associated with an incident, a target of an incident, and timing of an incident.

14. The set of one or more non-transitory machine-readable storage media of claim 9, wherein the grouping is performed using a rule-based grouping algorithm.

15. An electronic device configured to identify and classify community attacks, the electronic device comprising:

one or more processors; and a non-transitory machine-readable storage medium having instructions stored therein, which when executed by the one or more processors, causes the electronic device to:

determine, for each of a plurality of enterprise networks, one or more incidents occurring in that enterprise network based on analyzing security alerts generated by a web application layer attack detector used to protect a web application hosted in that enterprise network, wherein each incident represents a group of security alerts that have been determined as being associated with the same security event, group the incidents occurring across the plurality of enterprise networks into groups of incidents, wherein incidents that are determined as having similar features are grouped into the same group of incidents, classify each of one or more of the groups of incidents as being an industry-based attack or a spray-and-pray attack based on industry classifications of incidents within that group of incidents, wherein an industry-based attack is an attack that targets a single industry, and wherein a spray-and-pray attack is an attack that targets multiple industries, and determine, for a group of incidents classified as being an industry-based attack, a confidence value representing a measure of confidence that the group of incidents is an industry-based attack based on a story grade, a size grade, and an industry distribution grade, wherein the story grade represents a measure of how closely incidents within the group of incidents are related, the size grade represents a measure of a number of enterprise networks involved in the group of incidents, and the industry distribution grade represents a measure of homogeneity of the industry classifications of the incidents within the group of incidents.

16. The electronic device of claim 15, wherein the instructions, when executed by the one or more processors, further causes the electronic device to:

cause a result of the classification to be displayed by a management console.

17. The electronic device of claim 15, wherein the grouping is performed using a clustering-based grouping algorithm.

18. The electronic device of claim 17, wherein the clustering-based grouping algorithm uses a distance function to measure similarity of one or more features between incidents.

19. The electronic device of claim 17, wherein the instructions, when executed by the one or more processors, further causes the electronic device to:

classify a particular group of incidents from the groups of incidents as being a targeted attack in response to a determination that the particular group of incidents is not classified as being an industry-based attack or spray-and-pray attack.

20. The electronic device of claim 15, wherein the grouping is performed using a rule-based grouping algorithm.

* * * * *